US009268609B2

(12) United States Patent
Bacchus

(10) Patent No.: US 9,268,609 B2
(45) Date of Patent: Feb. 23, 2016

(54) APPLICATION THREAD TO CACHE ASSIGNMENT

(71) Applicant: HEWLETT-PACKARD DEVELOPMENT COMPANY, L.P., Houston, TX (US)

(72) Inventor: Reza M. Bacchus, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 257 days.

(21) Appl. No.: 13/874,179

(22) Filed: Apr. 30, 2013

(65) Prior Publication Data
US 2014/0325520 A1 Oct. 30, 2014

(51) Int. Cl.
G06F 9/46 (2006.01)
G06F 9/50 (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS

| 8,275,942 | B2* | 9/2012 | Yigzaw et al. | 711/128 |
| 8,522,241 | B1* | 8/2013 | Vohra et al. | 718/100 |
| 2004/0019891 | A1* | 1/2004 | Koenen | 718/102 |
| 2005/0262270 | A1* | 11/2005 | Latorre et al. | 710/1 |
| 2006/0095908 | A1* | 5/2006 | Norton et al. | 718/100 |
| 2006/0212594 | A1* | 9/2006 | Haner et al. | 709/232 |
| 2007/0150657 | A1* | 6/2007 | Yigzaw et al. | 711/128 |
| 2009/0070766 | A1* | 3/2009 | Berman et al. | 718/104 |
| 2009/0150893 | A1* | 6/2009 | Johnson et al. | 718/104 |
| 2009/0164399 | A1* | 6/2009 | Bell et al. | 706/25 |
| 2009/0187915 | A1* | 7/2009 | Chew et al. | 718/104 |
| 2010/0095300 | A1* | 4/2010 | West et al. | 718/104 |
| 2010/0223598 | A1* | 9/2010 | Levine et al. | 717/128 |
| 2010/0235840 | A1* | 9/2010 | Angaluri | 718/102 |
| 2010/0275206 | A1* | 10/2010 | Mewhinney et al. | 718/100 |
| 2011/0055838 | A1* | 3/2011 | Moyes | 718/102 |
| 2011/0161969 | A1* | 6/2011 | Arndt et al. | 718/103 |
| 2011/0185360 | A1* | 7/2011 | Mitchell et al. | 718/101 |
| 2011/0246995 | A1* | 10/2011 | Fedorova et al. | 718/103 |
| 2012/0144098 | A1* | 6/2012 | Yang et al. | 711/103 |
| 2012/0185776 | A1* | 7/2012 | Kirshenbaum et al. | 715/735 |
| 2012/0233393 | A1* | 9/2012 | Jiang et al. | 711/105 |
| 2013/0046811 | A1* | 2/2013 | Park et al. | 709/203 |
| 2013/0298137 | A1* | 11/2013 | Yamauchi et al. | 718/105 |

OTHER PUBLICATIONS

How to do the same calculations faster on 4-core CPU: 4 threads or 50 threads?—Internet Article—http://stackoverflow.com/questions/9183476/how-to-do-the-same-calculations-faster-on-4-core-cpu-4-threads-or-50-threads—Retrieved on Mar. 5, 2013—3pgs.

Stanley Lap Chiu Fung—Improving Cache Locality for Thread-Level Speculation Systems—Thesis Paper—2005—94pgs.—Univ. of Toronto.

(Continued)

Primary Examiner — Emerson Puente
Assistant Examiner — Mehran Kamran
(74) Attorney, Agent, or Firm — Hewlett Packard Enterprise Patent Department

(57) ABSTRACT

Techniques are described for assigning an application thread to a cache. A newly created application thread may be assigned to a plurality of caches. The cache assignment that optimizes performance may be determined. The newly created application thread may be associated with the determined cache.

15 Claims, 5 Drawing Sheets

(56) References Cited

OTHER PUBLICATIONS

Tian, T et al.—Software Techniques for Shared-Cache Multi-Core Systems—Internet—http://software.intel.com/en-us/articles/software-techniques-for-shared-cache-multi-core-systems-03-08-2012--9pgs.--Intel.

Wang, Xiaorui et al.—Achieving Fair or Differentiated Cache Sharing in Power-Constrained Chip Multiprocessors—Thesis—2010—10pgs.—Univ.of Tenn.—Knoxville, TN.

* cited by examiner

APPLICATION THREAD TO CACHE ASSIGNMENT

BACKGROUND

Currently available computers may have processors that contain multiple instruction execution units, referred to as cores. Each core may process a stream of instructions, relatively independently from one another. More sophisticated computers may contain multiple processors, each of which may contain multiple cores. Multi-threaded application programs may make use of the plurality of independent cores by having each thread of the application program run on a different core. Thus, the individual threads may truly execute concurrently, as each core processes instructions independently of the other cores.

DETAILED DESCRIPTION

Figure 1:
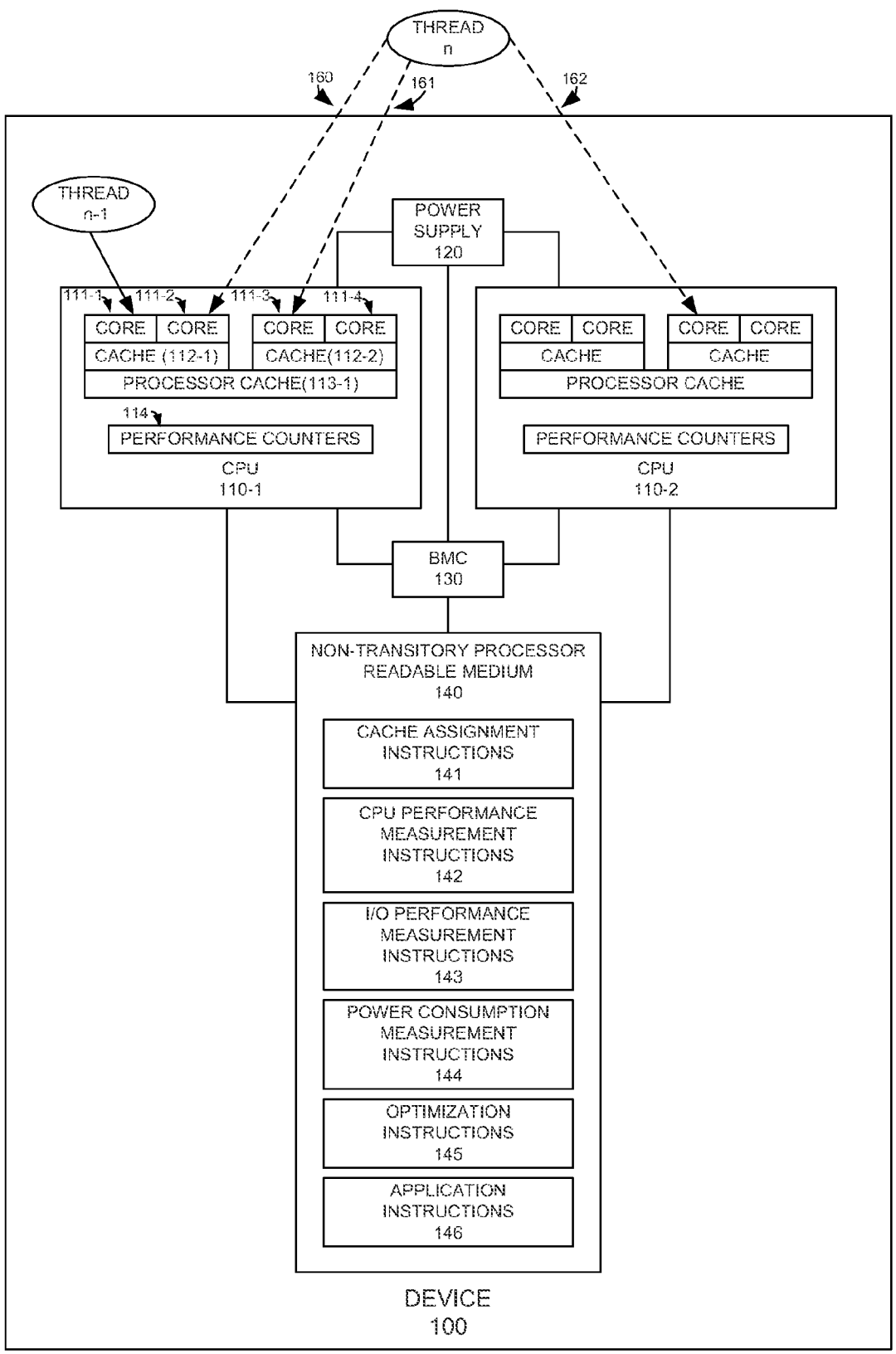
FIG. 1 is an example of a system utilizing the core assignment techniques described herein.

The availability of multiple cores on multiple processors on a computer can improve the operation of a multi-threaded application program by allowing the threads of the program to truly operate in parallel, with each thread executing on a separate core, up to the total number of cores available in the computer. However, the degree of improvement may be dependent on the rules used to assign an application program thread to a core.

Each processor in the computer may be associated with a processor cache memory. The processor cache memory is memory that is located on the processor die and may be accessed significantly faster than accessing main memory. Each core on each processor may also be associated with core cache memory that is specific to that core (or a set of cores). Just as with the processor cache memory, accessing core cache memory by a core is significantly faster than accessing either processor cache memory or main memory.

When a application program thread is running on a core and needs to access a particular piece of data, the core cache associated with that core is first checked to determine if the data resides in the core cache memory. If so, the data can be accessed quickly from the core cache. If the data is not present in the core cache, the processor cache of the processor is checked. If the data resides in the processor cache, the data may be accessed from the processor cache. If the data does not reside in the processor cache, the data may be retrieved from the main memory and placed in the core or processor cache.

The level of performance of an application thread is partially dependent on how quickly data may be accessed. The most efficient access to data is when the data resides in the core cache. The next most efficient is when the data resides in the processor cache. Even less efficient is when the data resides in main memory, and must first be moved into either the processor cache or core cache prior to use. As should be clear, the most efficient operation may be achieved by placing as much of the data used by an application thread in the core cache, followed by the processor cache, and finally main memory.

Cache memory, either core or processor, is not an unlimited resource. Thus, not all data can reside in a cache at the same time. When a cache becomes full, some data is evicted from the cache and sent to main memory to make room for new data to be added to the cache. Reducing the amount of time the core and processor spends moving data to and from main memory into and out of the cache memory can improve the operational performance of the computer. For purposes of this description, moving data between caches and main memory is referred to as thrashing the cache. In addition, for purposes of this description, assigning a thread to a cache or a core will be used interchangeably. Thus, a thread assigned to a core is also assigned to the core cache associated with that core, and is associated with the processor cache of the processor containing the core.

The manner in which application program threads are assigned to cores may determine the level of cache thrashing. For example, if two threads use the same data set and are both assigned to the same core, the level of cache thrashing may be reduced because both threads are using the same data. However, if both threads use different data sets, the level of thrashing may increase. This is because each thread will constantly be evicting the data in the core cache to make room for its own data. Similarly, if two threads share large portions of data, but not the exact same data, assigning both threads to the same processor, but different cores may improve performance. The shared data may be stored in the processor cache, while thread specific data resides in the core cache. Thus each thread will not constantly be evicting the other threads data.

If two threads share no data, performance may be improved by assigning the threads to cores that are on different processors. Thus, neither thread will be trying to evict data from the cache that is needed by the other thread. As should be clear, assignment of threads to caches may become extraordinarily complex. Furthermore, the assignment rules are application program specific, such that general rules are of little use. The proper assignment rules to use are application dependent.

In order to optimize application and computer performance, the services of highly trained personnel, also referred to as bench mark engineers, may be retained. Bench mark engineers may be intimately familiar with the cache structure of a computer. A bench mark engineer may tune the system for optimum performance against a user specified criteria, by configuring the system to assign threads to caches according to rules that optimize the user specified criteria.

However, there are several problems with using bench mark engineers. One of these problems is that in order to optimize the assignment rules, the bench mark engineer needs to have great familiarity with the application. Thus, a different benchmark engineer may need to be employed for each application, as it may be difficult or impossible to find a bench mark engineer that is familiar with every possible application that may be run on the computer. Furthermore, even after the bench mark engineer has tuned the system, the addition or subtraction of applications may make the previous tuning sub-optimal. The bench mark engineer may need to re-tune the computer after every change in workload running on the computer. Finally, bench mark engineers are highly skilled professionals, whose time costs a premium. The operational expense in employing bench mark engineers, even for initial tuning, may be cost prohibitive.

Techniques described herein provide for the computer to automatically determine the rules for thread assignment that will optimize performance based on user defined criteria. The user may specify a particular performance metric of the computer system that is to be optimized. For example, the user may specify that one or more of latency, throughput, or power usage should be optimized. The system may then receive requests for creating new application threads.

Upon receipt of a request to create a new application thread, the system may create the application thread and assign the thread to a cache according to one of the rules. The assignment may be temporary, such as for a fixed period of time (e.g. 1 second, two seconds, 4 seconds, etc.). While the thread is running according to the thread assignment rule, performance metrics for the system may be measured and stored. Once the fixed period of time has elapsed, the performance metrics may be collected. This process may repeat for as many different assignment rules as are available.

Once the thread has run for a period of time under each of the assignment rules and performance metrics for each run have been collected, the performance metrics may be analyzed to determine which assignment rule is optimum, based on the user specified criteria. For example, if the user specified that throughput should be optimized, then the assignment rule that provided for the best throughput results may be selected. The thread may then be permanently assigned to a cache according to the determined assignment rule.

It should be noted that the techniques described herein do not require the services of a benchmark engineer. Furthermore, the techniques require no prior knowledge of an application's structure, as the selection of an assignment rule is not dependent on the application's structure, but rather on how the application actually performs when running. Finally, the optimization takes into account the current workload on the system, because assignment rule selection is done while the application may be running on a computer that is also running other applications.

FIG. 1 is an example of a system utilizing the core assignment techniques described herein. The device 100 may be any type of electronic device that utilizes processors. Some example devices can include server computers, desktop computers, laptop computers, mobile phones, or any other such device. What should be understood is that the techniques described herein are applicable in any type of device with multiple caches, where application program threads may be assigned to different caches.

The device 100 may include Central Processing Units(CPUs) 110-1,2. For purposes of ease of description, only two CPUs are shown, however it should be understood that devices with any number of CPUs may utilize the techniques described herein. CPUs, which are also referred to as processors may reside within the device. In some cases, the CPU may reside in a socket within the device, which allows for the CPU to be changed, independent of the device. In other cases, the CPUs may be hard wired within the device. For purposes of this description, a CPU may also be referred to as a socket. Thus, assigning a thread to a socket means that the thread is assigned to the CPU within that socket, regardless of if the CPU is removable or not.

For ease of description, only one CPU is described in detail. It should be understood that each CPU may have a similar, although not necessarily identical, structure to the one described. Each processor 110-1,2 may include a plurality of cores 111-1-4. The cores are the units on the CPU that actually execute instructions. Each core may be coupled to a core cache 112-1,2. The core caches 112-1,2 may be a local memory for each core. A core may be able to access data stored in its own core cache much more quickly than data stored elsewhere. As shown, multiple cores may be coupled to the same core cache. For example, cores 111-1,2 are both coupled to core cache 112-1, while cores 111-3,4 are coupled to core cache 112-2. For purposes of this description, assigning a thread to a cache for a core means that the thread will execute on a core that is coupled to the assigned core cache.

The CPU may also contain a processor cache 113-1. The processor cache is similar to a core cache, with the exception that the processor cache is accessible to all cores that reside on the CPU. A core may access data stored in the processor cache, although such access is slower than accessing the data from the core's associated core cache. However, accessing data from the processor cache is faster than accessing data from main memory (not shown). The CPU may also contain performance counters 114. These performance counters may maintain a count of certain events that occur within the processor, as those events relate to performance of the device. For example, each time a core is unable to find needed data in its own cache, which is also referred to as a cache miss, a performance counter may be incremented. Similarly, whenever there is a cache miss on the processor cache, a counter may be incremented.

The performance counters may also gather data about other performance metrics. For example, the performance counters may measure the amount of memory bandwidth that is being used. Memory bandwidth is used when data needs to be retrieved from main memory because the data is not available in any of the caches. Another example of a type of performance metric that may be collected is memory latency. It takes time to retrieve data from main memory, and that time is dependent on the overall workload running on the device. Memory latency measures how well the applications running on the device are performing. Thus, by analyzing the performance counters, at least a portion of a view of the operation of the device overall can be achieved.

The device 100 may also include a Power Supply 120. The power supply may take electrical voltage from a source, and convert it to a voltage usable by the device 100. For example, the power supply may take power provided by the power company and convert it to a form that is usable by the device. The power supply may keep track of how much power it is supplying to the device. The device may also include a baseboard management processor (BMC) 130. The BMC may be a processor, similar to the CPUs, that is used to manage the device as a whole. One function of the BMC may be to retrieve the amount of power that is being consumed by the device. This information may then be used in determining a proper thread assignment rule, as will be explained in further detail below.

The device may also include a non transitory processor readable medium 140. The medium 140 may contain thereon a set of instructions, which when executed by the processor causes the processor to implement the techniques described herein. The medium 140 may include cache assignment instructions 141, CPU performance measurement instructions 142, input/output performance measurement instructions 143, power consumption measurement instructions 144, optimization instructions 144, and application instructions 145.

The cache assignment instructions may include the rules that determine how a thread of an application is to be assigned to a cache. In one example implementation, the cache assignment instructions may assign a thread to a cache based on where the last thread created was assigned. This process is described in further detail below. The cache assignment instructions may be integrated as part of an operating system running on the device or may be included in a driver that is loaded by the operating system. Regardless of how implemented, the cache assignment instructions determine how a thread is assigned to a cache. The CPU performance measurement instructions may measure CPU performance by retrieving the performance counter 114 data from the CPUs. These performance counters may be used to determine the operational performance of the CPUs.

The input/output performance measurement instructions may be used to retrieve other types of performance measurements from the device. For example, many applications perform input/output operations, such as reading and writing to a disk drive or a network interface. These operations are typically done through a driver, which is a piece of computer code designed to interface with the particular input/output device being used. These drivers may maintain their own performance related information, such as how long each operation takes. The input/output performance measurement instructions may interface with the drivers to retrieve performance information related to the drivers.

The power consumption measurement instructions may be used to interface with the BMC to retrieve the amount of power being used by the device. Assignment of threads to different caches may impact the amount of power used by the device. For example, if all threads are assigned to a single CPU, other CPUs may be placed in a low power state, thus reducing the overall power consumed. The power consumption measurement instructions may be used to determine how much power the device is consuming based on the current thread assignment rules.

The optimization instructions may be used to receive a selection from the user of the particular performance aspect of the device that is desired to be optimized. It is very often the case that optimizing one performance measure may cause a different performance measure to operate at sub-optimum levels. For example, if it is desired to optimize power consumption, all threads may be assigned to a single CPU, and the remaining CPUs placed in a low power state. Although this may optimize power usage, throughput may suffer, because the entire workload is only being processed by a single processor. The particular performance metric to optimize is highly dependent on the device operator and the application that is being run. For some workloads, it may be desired to optimize power usage, while for others throughput or latency may be more important.

The user may specify to the system the performance criteria that is to be optimized. The techniques described in further detail below may then be used to optimize the specified criteria. In some implementations, the user may specify more than one criterion, in order, to be optimized. The system may then determine the thread assignment rules that provide optimum performance for the first criterion, while secondarily attempting to optimize the second criterion. The application instructions are the instructions for an application program itself. These instructions determine when threads are created or destroyed, and provide the functionality of the application. The particular functionality provided by the application is unimportant with respect to the techniques described herein.

In operation, a user may wish to optimize performance of a device 100 running an application defined by the application instructions 146. The optimization instructions may prompt the user for the performance measure that is to be optimized. For example, performance may be optimized for optimum throughput, latency, or power usage. It should be understood that the performance measures specified are simply examples, and any other performance measures may be used with the techniques described herein. In some implementations, the user may also specify a minimum threshold performance level of the device.

If a minimum performance level threshold of the device is specified, the optimization instructions may determine if starting the application will cause performance to drop below the threshold by analyzing the current state of the various performance measures. If starting the new application would cause performance of the device to drop below the specified threshold, the optimization instructions may alert the user that the application could not be started.

If the application can be started, the optimization instructions may launch the application. Typically, a multi threaded application will start as a single thread, and then will create additional threads as needed. At some point in time, the application may request the creation of a new application program thread. In some implementations, the optimization instructions may first determine if adding an additional thread may cause device performance to drop below the specified threshold. If so, the optimization instructions may reject the applications request to create a new thread.

If the optimization instructions determine that a new thread may be created, the optimization instructions may assign the new thread to a cache using the thread assignment rules. Some examples of thread assignment rules may include assigning the thread to the same core cache as the last created thread, assigning the thread to a different core cache, but on the same CPU socket as the last created thread, or assigning the thread to a different CPU socket as the last created thread.

The optimization instructions may first reset all of the performance measures. For example, the performance counters may be reset, the I/O performance measurements may be reset, and the power usage performance measures may be reset. The optimization instructions may then assign the thread to a cache based on one of the thread assignment rules. The optimization instructions may allow the thread to remain assigned according to a specific rule for a fixed period of time. For example, the thread may run according to a given rule for 1 second, 2 seconds, 4 seconds, or any other fixed period of time. Once the time period has elapsed, the optimization instructions may collect data from the performance counters, the I/O performance measurements, and the power usage. This data may be used to select the optimum thread assignment rule, as will be described below.

After running for a fixed time period using one of the thread assignment rules, the process may be repeated using a different thread assignment rule. Again, performance data may be gathered to determine the device performance for each of the thread assignment rules. After all the rules have been used for a fixed period of time, the performance measurement results may be compared. The particular assignment rule that provided optimum results for the user specified optimization criteria may then be selected as the thread assignment rule for the newly created thread. The thread may then be assigned using the selected rule.

For example, an application thread (n) may be created. The thread may first be assigned 160 to the same core cache as the last created thread (n-1) and allowed to run for a fixed period of time, after which performance measurements are retrieved. The thread may then be assigned 161 to the same CPU socket, but on a different core cache as the last created thread. Again, after the fixed period of time, the performance measurements may be retrieved. Finally, the thread may be assigned 162 to a different CPU socket than the last created thread. After the fixed period of time, the performance measurements may be retrieved.

The optimization instructions may then analyze the retrieved performance measurements to determine the thread assignment rule that optimizes the user specified criterion. For example, if the user specified that power usage should be optimized, the thread assignment rule that resulted in the lowest power usage may be selected. If latency was to be optimized, the thread assignment rule that resulted in the lowest latency may be selected. The thread may then be assigned to a cache based on the selected thread assignment rule.

Figure 2:
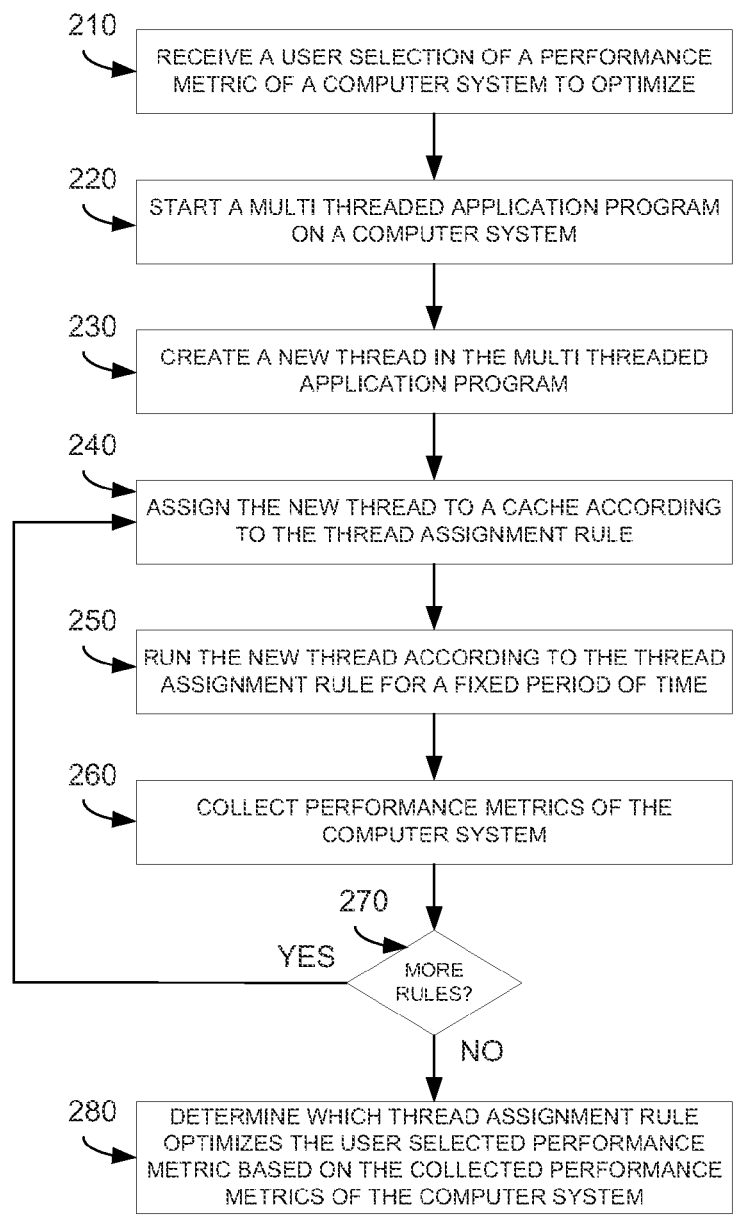
FIG. 2 is an example of a high level flow diagram for selecting a thread assignment rule, according to the techniques described herein.

FIG. 2 is an example of a high level flow diagram for selecting a thread assignment rule, according to the techniques described herein. In block 210, a user selection of a performance metric of a computer system to optimize may be received. As explained above, the performance metric may include throughput, latency, power usage, or any other type of performance metric. In block 220, a multi threaded application program may be started on the computer system. In block 230, a new thread in the multi threaded application program may be created.

In block 240, the new thread may be assigned to a cache according to a thread assignment rule. As explained above, some example thread assignment rules include assigning the thread to the same core cache as the last created thread, to a different core cache on the same CPU socket as the last created thread, and to a different CPU socket than the last created thread. In block 250, the new thread may be run for a fixed period of time according to the thread assignment rule from block 240. In block 260, performance metrics for the computer system may be collected.

In block 270, it may be determined if there are more thread assignment rules. If so, the process returns to block 240, and repeats, using a different thread assignment rule. The loop between blocks 240-270 continues until all available thread assignment rules have been used and performance metrics for each rule have been collected. In block 280, it may be determined which thread assignment rule optimizes the user selected performance metric. This determination may be made based on the performance metrics that were collected for each thread assignment rule.

Figure 3:
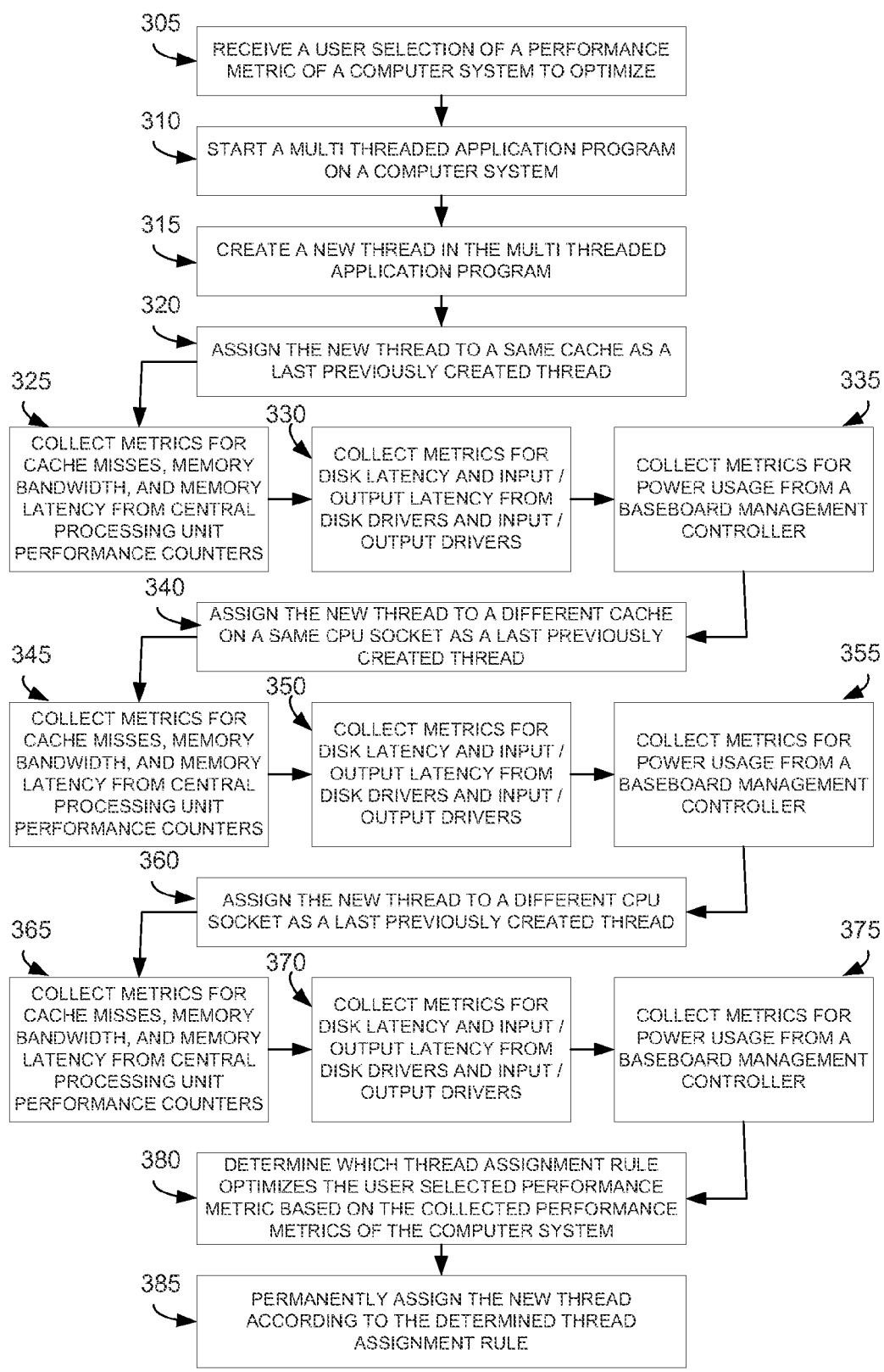
FIG. 3 is another example of a high level flow diagram for selecting a thread assignment rule, according to the techniques described herein.

FIG. 3 is another example of a high level flow diagram for selecting a thread assignment rule, according to the techniques described herein. Just as with respect to FIG. 2, in block 305 a user selection of a performance metric to optimize may be received. In block 310 a multi threaded application program may be started on the computer system. In block 315 a new thread may be created in the multi threaded application program.

In block 320, the new thread may be assigned to the same core cache as a last previously created thread. In other words, the newly created thread is assigned to the same core cache as the last thread created by the computer system. In block 325, metrics for cache misses, memory bandwidth, and memory latency may be collected from central processing units performance counters. In block 330, performance metrics for disk latency and input/output latency may be collected from disk drivers and input/output drivers. In block 335, power usage metrics may be collected from a baseboard management controller.

In block 340, the new thread may be assigned to a different core cache on the same CPU socket as a last previously created thread. In other words, the thread is assigned to the same processor as the last previously created thread, but is assigned to a core that uses a different core cache as the last previously created thread. In blocks 345, 350, and 355, performance metrics may be collected, similar to the collection described above with respect to blocks 325, 330, and 335 respectively.

In block 360, the new thread may be assigned to a different CPU socket as a last previously created thread. In other words, the thread is assigned to a different processor as the last previously created thread. In blocks 365, 370, and 375, performance metrics may be collected, similar to the collection described above with respect to blocks 325, 330, and 335 respectively. In block 380, it may be determined which of the thread assignment rules optimizes the user selected performance metric based on the collected performance metrics. In other words it may be determined which of the thread assignment rules in blocks 320, 340, and 360 optimize the particular performance metric specified by the user in block 305. In block 385, the new thread may be permanently assigned according to the thread assignment rule determined in block 380.

Figure 4:
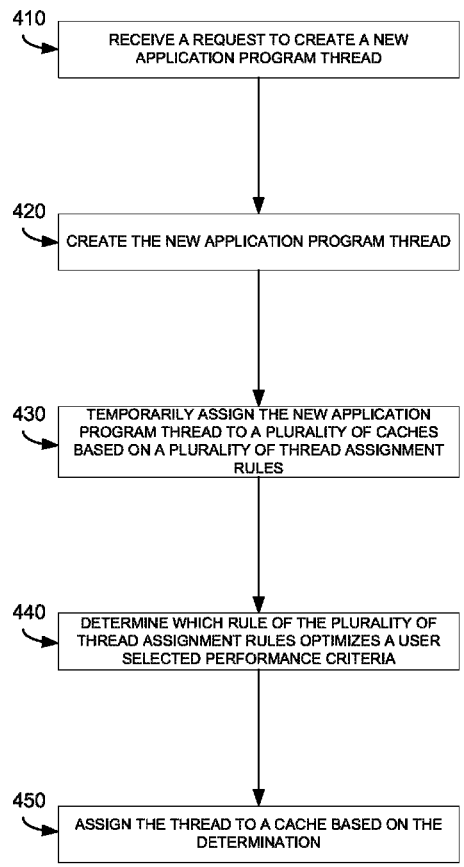
FIG. 4 is an example of a high level flow diagram for receiving a request to create an application thread and assigning the thread, according to techniques described herein.

FIG. 4 is an example of a high level flow diagram for receiving a request to create an application thread and assigning the thread, according to techniques described herein. In block 410, a request to create a new application thread may be received. In block 420, the new application program thread maybe created. In block 430, the new application program thread may be temporarily assigned to a plurality of caches based on a plurality of thread assignment rules. In other words, the thread is temporarily assigned to caches using different rules for each assignment, in order to determine which rule provides the optimized results.

In block 440, it may be determined which of the plurality of thread assignment rules optimizes a user selected performance criteria. In other words, it is determined which thread assignment rule results in the optimum performance for the user specified metric, given the various rules available. In block 450, the thread may be assigned to a cache based on the determination. In other words, the thread will remain assigned according to the thread assignment rule that resulted in optimum performance for the user selected optimization criterion.

Figure 5:
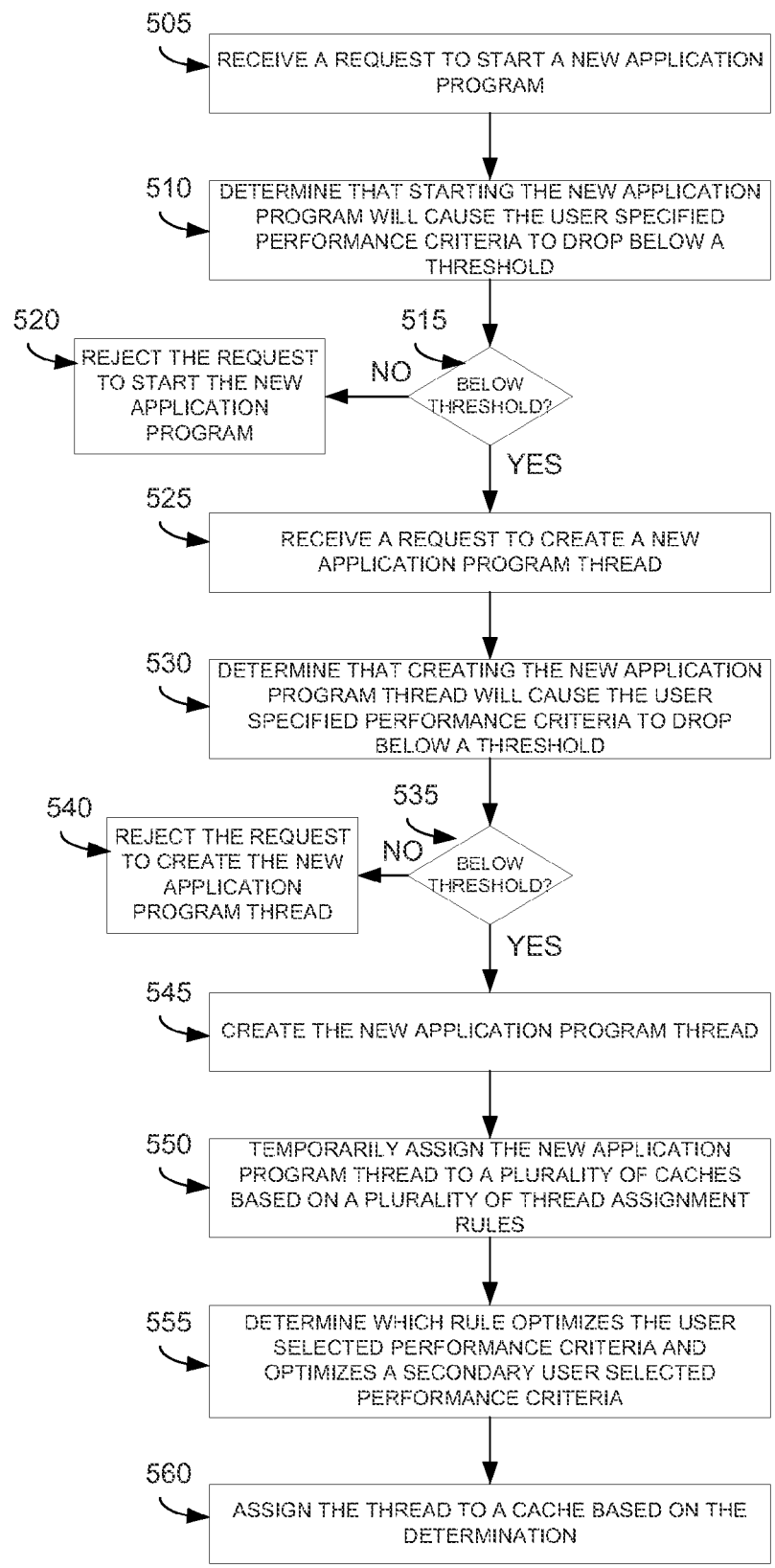
FIG. 5 is another example of a high level flow diagram for receiving a request to create an application thread and assigning the thread, according to techniques described herein.

FIG. 5 is another example of a high level flow diagram for receiving a request to create an application thread and assigning the thread, according to techniques described herein. In block 505, a request to start a new application program may be received. In block 510, it may be determined if starting the new application program will cause user specified performance criteria to drop below a threshold. As mentioned above, in some implementations, the user may specify a minimum threshold of performance. If adding a new application would result in performance dropping below the threshold, the request to start the new application may be rejected. In block 515, if it is determined that starting the application would result in performance dropping below the threshold, the process moves to block 520. In block 520, the request to start the new application program may be rejected.

Otherwise, the process moves to block 525. In block 525 a request to create a new application program thread may be received. In block 530, it may be determined if creating the new application program thread will cause the user specified performance criteria to drop below a threshold. In block 535, it may be determined if performance would drop below the threshold. If so, the process moves to block 540. In block 540, the request to create the new application program thread may be rejected.

Otherwise, the process moves to block 545. In block 545, the new application program thread is created. In block 550, the new application program thread may be temporarily assigned to a plurality of caches based on a plurality of thread assignment rules. In block 555, it may be determined which rule optimizes the user selected performance criteria and optimizes a secondary user selected performance criteria. As mentioned above, in some implementation, a user may specify multiple criteria for which to optimize. The determination in block 555 may determine which rule optimizes the first criterion. If multiple rules result in similar performance for the first criterion, the rule which optimizes the second criterion may be selected. In block 560, the thread may be assigned based on the determined rule.

I claim:

1. A method comprising:
   receiving a user selection of a performance metric of a computer system to optimize;
   starting, by a processor of a device, a multi-threaded application program on the device;
   creating, by the processor, a new thread in the multi-threaded application program;
   temporarily assigning, by the processor, the new thread to a cache according to each of a plurality of thread assignment rules;
   running, by the processor, the new thread according to each of the plurality of thread assignment rules for a fixed period of time;
   collecting performance metrics of the device based on the running of the new thread according to each of the plurality of thread assignment rules;
   determining, by the processor, which thread assignment rule of the plurality of thread assignment rules optimizes the user-selected performance metric based on the collected performance metrics of the device; and
   assigning, by the processor, the new thread to a cache according to the thread assignment rule that optimizes the user-selected performance metric.

2. The method of claim 1 further comprising:
   permanently assigning the new thread according to the determined thread assignment rule.

3. The method of claim 1 wherein the plurality of thread assignment rules includes:
   assigning the new thread to a same cache as a last previously created thread.

4. The method of claim 1 wherein the plurality of thread assignment rules includes:
   assigning the new thread to a different cache on a same CPU socket as a last previously created thread.

5. The method of claim 1 wherein the plurality of thread assignment rules includes:
   assigning the new thread to a different CPU socket as a last previously created thread.

6. The method of claim 1 wherein collecting performance metrics further comprises:
   collecting metrics for cache misses, memory bandwidth, and memory latency from central processing unit performance counters.

7. The method of claim 1 wherein collecting performance metrics further comprises:
   collecting metrics for disk latency and input/output latency from disk drivers and input/output drivers.

8. The method of claim 1 wherein collecting performance metrics further comprises:
   collecting metrics for power usage from a baseboard management controller.

9. A non-transitory computer readable storage medium containing instructions thereon which when executed by a processor cause the processor to:
   receive a user selection of a performance metric of a computer system to optimize;
   receive a request to create a new application program thread for the performance metric;
   create the new application program thread;
   temporarily assign the new application program thread to a cache according to each of a plurality of thread assignment rules;
   determine which thread assignment rule of the plurality of thread assignment rules optimizes the user-selected performance metric; and
   assign the new application program thread to a cache based on the the thread assignment rule that optimizes the user-selected performance metric.

10. The medium of claim 9, further comprising instructions to:
    determine that creating the new application program thread will cause the user-selected performance metric to drop below a threshold; and
    reject the request to create the new application program thread.

11. The medium of claim 9, further comprising instructions to:
    receive a request to start a new application program;
    determine that starting the new application program will cause the user-selected performance metric to drop below a threshold; and
    reject the request to start the new application program.

12. The medium of claim 9, wherein, to determine which thread assignment rule of the plurality of thread assignment rules optimizes a user-selected performance metric, the instructions are to cause the processor to:
    determine which thread assignment rule optimizes the user-selected performance metric based on a user specified criteria.

13. A device comprising:
    a first processor, the first processor including a plurality of cores, wherein each core is associated with a cache, the first processor including performance counters to determine first processor performance metrics;
    a baseboard management processor to measure an amount of power consumed by the device;
    a memory containing instructions which when executed by the first processor cause the first processor to implement an input/output driver, the input/output driver maintaining performance metrics; and
    the memory further containing instructions which when executed by the first processor cause the first processor to:
    receive a user selection of a performance metric of the device to optimize,
    temporarily assign a new application thread to the first processor and caches according to each of a plurality of cache assignment rules,
    determine which cache assignment rule of the plurality of cache assignment rules optimizes the user-selected performance metric based on the first processor performance metrics, the power consumed, and the input/output driver performance metrics, and
    assign the new application thread to the first processor and caches according to the cache assignment rule that optimized the user-selected performance metric.

14. The device of claim 13 a further comprising:
    a second processor, the second processor including a plurality of cores, wherein each core is associated with a cache, the second processor including performance counters to determine second processor performance metrics;

wherein the instructions are to cause the first and second processors to assign the new application thread to caches on the first and second processors according to each of the plurality of cache assignment rules, and to determine which cache assignment rule of the plurality of cache assignment rules optimizes the user-selected performance metric based on the processor performance metrics from the first and second processors.

15. The device of claim 13 wherein the optimized performance metric is based on a user selected optimization criteria.

* * * * *

UNITED STATES PATENT AND TRADEMARK OFFICE
CERTIFICATE OF CORRECTION

PATENT NO. : 9,268,609 B2
APPLICATION NO. : 13/874179
DATED : February 23, 2016
INVENTOR(S) : Bacchus It is certified that error appears in the above-identified patent and that said Letters Patent is hereby corrected as shown below:

In the Claims

In column 10, line 12 approx., in Claim 9, delete "the the" and insert -- the --, therefor.

In column 10, line 62, in Claim 14, delete "13 a" and insert -- 13, --, therefor.

Signed and Sealed this
Second Day of August, 2016

Michelle K. Lee
*Director of the United States Patent and Trademark Office*